July 12, 1949.  W. D. CROCKER ET AL  2,476,028
IMPULSE COUPLING

Filed Dec. 3, 1946  3 Sheets-Sheet 1

INVENTORS.
WILLIAM D. CROCKER
CHARLES STRNISTE
BY Raymond A. Paquin
ATTORNEY

July 12, 1949.　　W. D. CROCKER ET AL　　2,476,028
IMPULSE COUPLING

Filed Dec. 3, 1946　　3 Sheets-Sheet 3

INVENTORS.
WILLIAM D. CROCKER
CHARLES STRNISTE
BY Raymond A. Paquin
ATTORNEY.

Patented July 12, 1949

2,476,028

UNITED STATES PATENT OFFICE 2,476,028

IMPULSE COUPLING

William D. Crocker, Suffield, Conn., and Charles Striniste, Agawam, Mass., assignors to American Bosch Corporation, Springfield, Mass., a corporation of New York Application December 3, 1946, Serial No. 713,638

7 Claims. (Cl. 171—209)

1

This invention relates to impulse couplings adapted for use in connection with magnetos or electric generators supplying ignition current to internal combustion engines or the like.

An object of the invention is to provide a new and improved impulse coupling which will have a constant throw-out speed in any magneto position whether vertical, horizontal or otherwise.

Another object of the invention is to provide a new and improved means for spring loading the catches of an impulse coupling to facilitate the operation of the coupling in any magneto position.

Another object of the invention is to provide a new and improved means for connecting the weights or catches of an impulse coupling whereby they will operate simultaneously and to the same extent and wherein the operation of the weights or catches is not substantially affected by gravity, thus providing constant throw-out speed in any magneto position.

Another object of the invention is to provide a simple, efficient and economical means for spring loading the catches or weights of an impulse coupling.

Other objects and advantages of the invention will be apparent from the following description taken in connection with the accompanying drawings, but, of course, changes may be made in the various details of construction and arrangement of parts without departing from the principle of the invention or exceeding its scope.

Referring to the drawings:

Fig. 3 is a sectional view taken on line 3—3 of Fig. 2 looking in the direction of the arrows;

Figure 1:
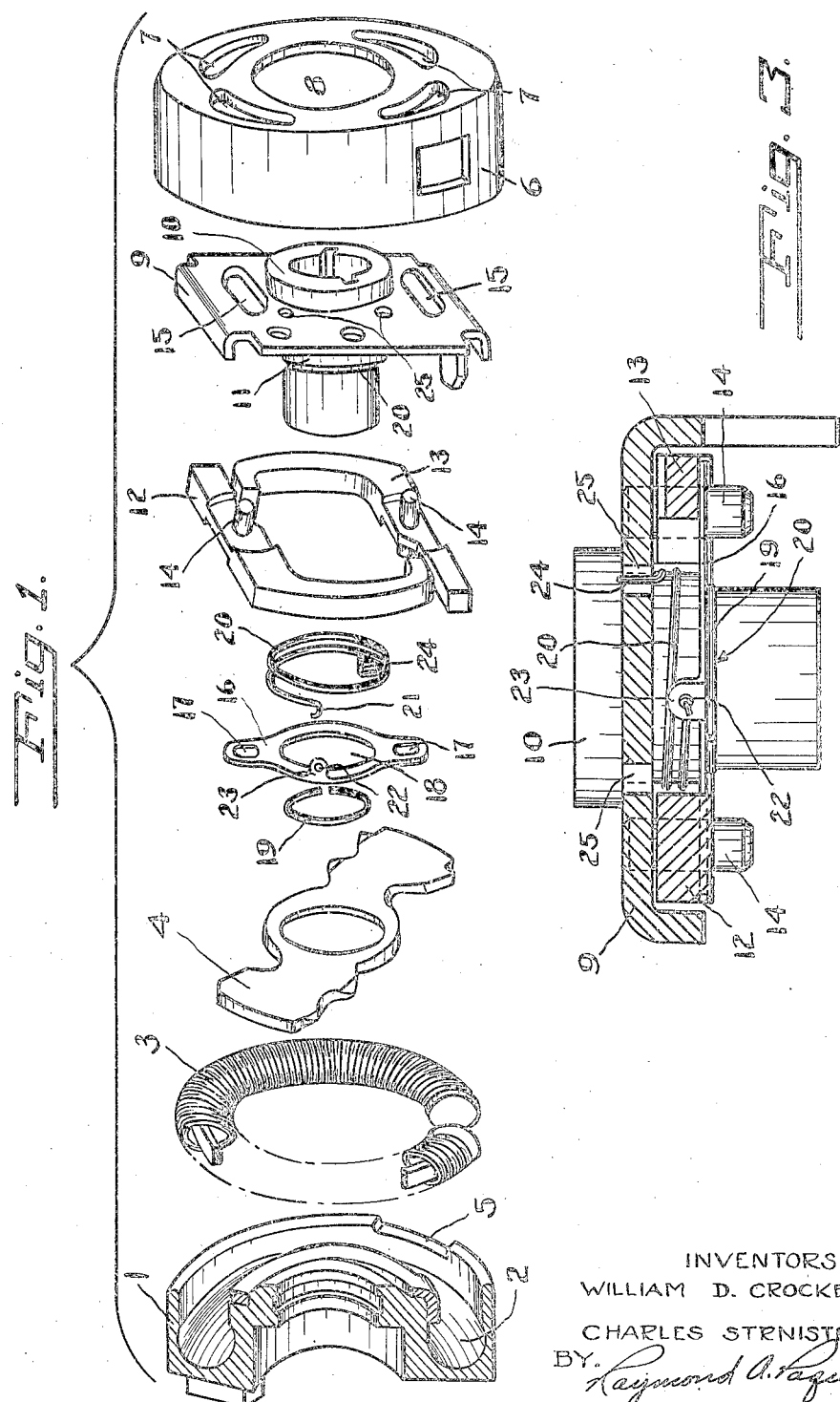
Fig. 1 is an exploded view showing in perspective the various parts of the coupling in the relative positions they assume when assembled.

Referring more particularly to the drawings, wherein similar reference characters designate corresponding parts throughout the several views, the coupling shown embodying the invention comprises a casing or housing 1 having an annular recess 2 adapted to contain the spring 3. The cam member 4 is adapted to seat in recesses 5 in opposite sides of the flange in the housing 1 and said cam is reversible depending upon whether the coupling is installed for clockwise or anticlockwise rotation.

2

The arrester plate or cover 6 is adapted to be secured by fastening devices such as screws positioned through the openings 7 to the end of the magneto and at the center of said arrester plate or cover is the opening 8 for the shaft or driving member not shown.

The hub plate 9 is adapted to be positioned within the arrester plate 6 and has secured thereto the hub 10 adapted to be keyed on the driving shaft and having the shoulder 11.

The relatively movable L-shaped catch members 12 and 13 are adapted to be positioned on the plate 9 and have studs 14 projecting from both sides thereof and at one end the studs enter slots 15 in the plate 9.

On the opposite projecting ends of the studs 14 is positioned the connecting plate 16 which has the opening 17 adapted to receive said studs 14 and which has the central opening 18 adapted to receive the hub 10 and to be retained in position thereon by the spring retaining member 19 which is adapted to be resiliently retained in the slot 20 in the surface of the hub 10 to retain the connecting plate 16 against the shoulder 11 of the hub 10 and with the ends of the studs 14 projecting through the opening 17.

The coil spring 20 is positioned on the shoulder 11 of the hub 10 and has the hooked end 21 adapted to be inserted through the opening 22 in the integral tongue 23 on the connecting plate 16 with the body of the spring extending around said shoulder 11 of the hub 10 and the opposite hooked end 24 extending through one of the openings 25 in the plate 9.

If the coupling is intended for clockwise rotation, the spring is lefthand wound and if the coupling is intended for anticlockwise rotation, the spring is righthand wound and the opening 25, through which the end 24 of the spring projects, will depend upon the direction of rotation for which the coupling is intended.

Figure 2:
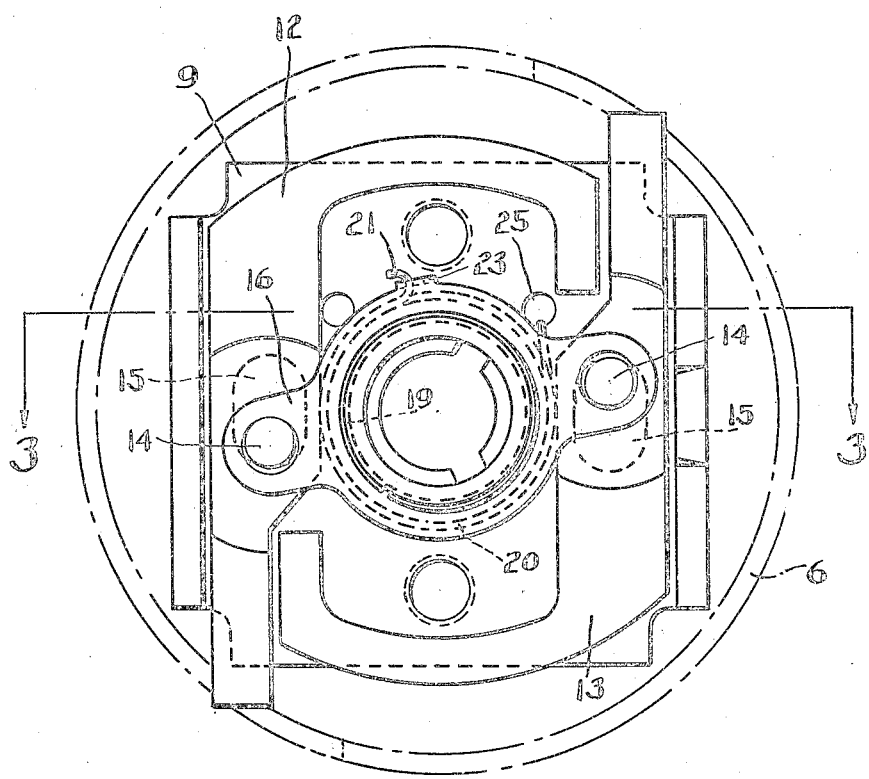
Fig. 2 is a front view of the coupling with the housing and spring removed.
Figure 4:
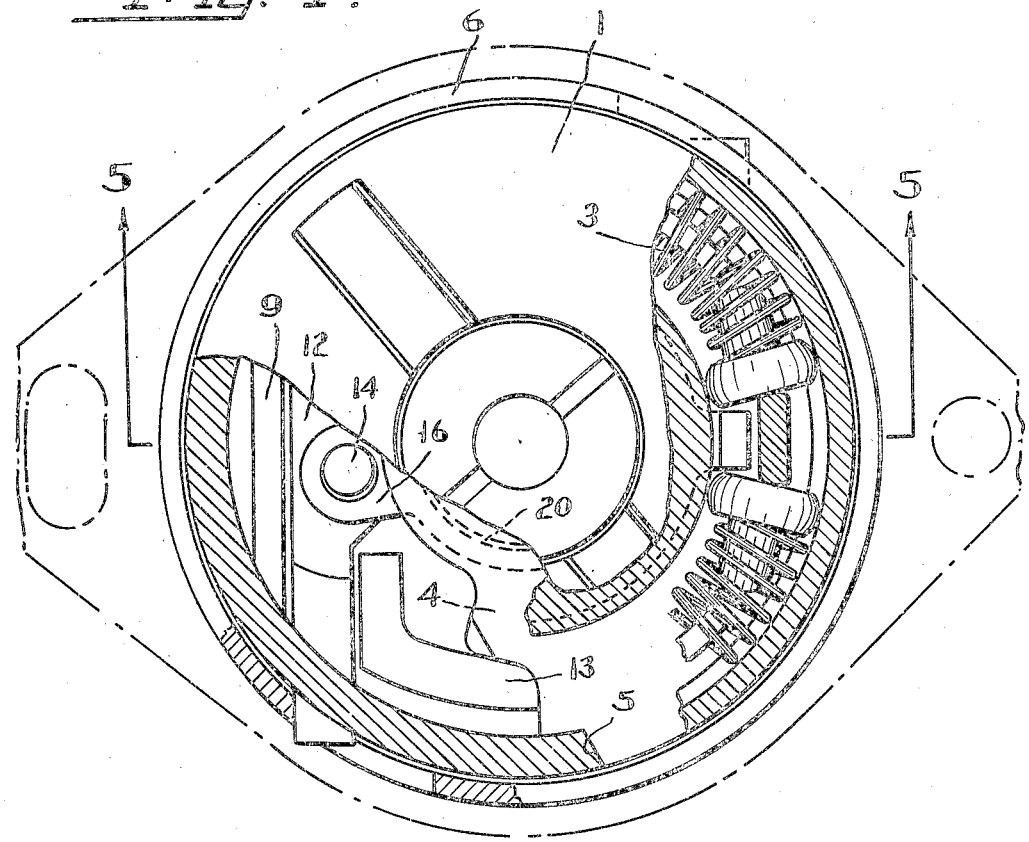
Fig. 4 is a front view, partly in section, of the coupling.
Figure 5:
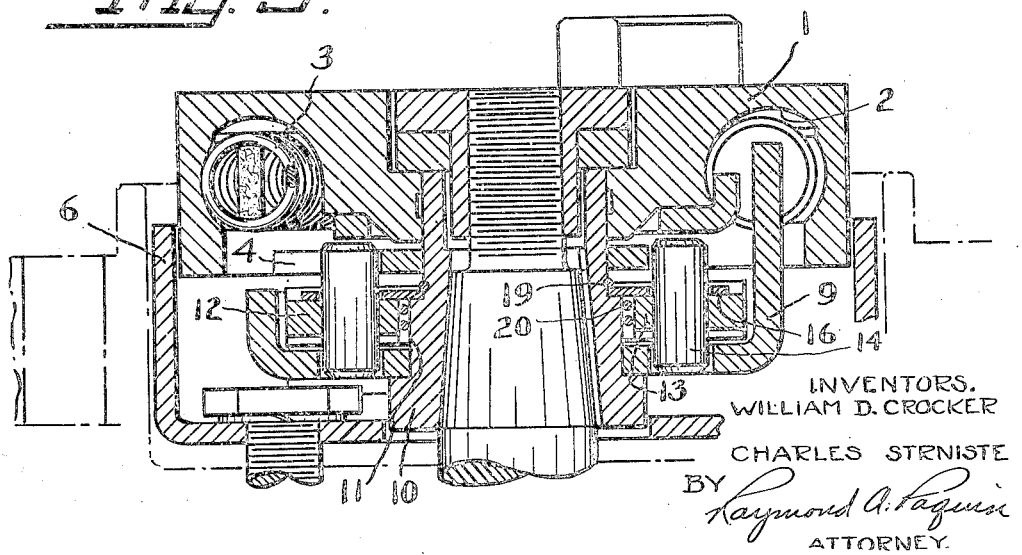
Fig. 5 is a sectional view taken on line 5—5 of Fig. 4 looking in the direction of the arrows.

Upon sliding movement of the weights or catch members 12 and 13, the connecting member 16 will pivot on the hub 10, as shown in Fig. 2, thereby retaining the weights or catch members in corresponding positions on opposite sides of the hub and thereby spring loading said weights so that the coupling will operate in any position of the magneto such as vertical, horizontal or otherwise and providing a constant throw out speed in any magneto position.

It is pointed out that because of the spring loading of the coupling as described above and the hooking or connecting of the weights or catches together, the operation of the weights or catches is not influenced by gravity and the weights necessarily work together simultaneously.

In view of the foregoing it will be seen that we have provided simple, efficient and economical means for obtaining all of the objects and advantages of the invention.

Having described our invention, we claim:

1. In an impulse coupling for use with a magneto, said impulse coupling having a hub member and a pair of catch members on opposite sides of the hub member, said catch members being mounted for sliding movement in opposite directions, a connecting plate pivotally mounted on said hub and connecting said catch members for allowing simultaneous sliding movement of said catch members in opposite direction to an equal extent for spring loading said catches and maintaining substantially constant throw-out speed regardless of magneto position.

2. In an impulse coupling for use with a magneto, said impulse coupling having a hub member and a pair of catch members on opposite sides of the hub member, said catch members being mounted for sliding movement in opposite directions, a connecting plate pivotally mounted on said hub connecting said catch members for allowing simultaneous movement of said catch members in opposite directions to an equal extent and a spring member secured to said plate and hub for resiliently urging said catch members for spring loading said catches and maintaining substantially constant throw-out speed regardless of magneto position.

3. In an impulse coupling for use with a magneto, said impulse coupling having a hub member and a pair of catch members on opposite sides of the hub member, a connecting plate mounted for pivotal movement about said hub and connecting said catch members for allowing simultaneous movement of said catch members in opposite directions to an equal extent and a coil spring member surrounding said hub and having one end secured to said connecting member and its other end secured to said hub member for spring loading said catches and maintaining substantially constant throw-out speed regardless of magneto position.

4. In an impulse coupling for use with a magneto, said impulse coupling including a pair of catch members each having a connecting portion, a hub member, a connecting member pivotally mounted on said hub member and being connected to the connecting portions of said catch members adjacent its opposite ends for allowing simultaneous movement of said catch members in opposite directions to an equal extent and a resilient member connected to said connecting plate adjacent one end and to said hub member adjacent its opposite end for spring loading said catches and maintaining substantially constant throw-out speed regardless of magneto position.

5. In an impulse coupling for use with a magneto, said impulse coupling including a pair of catch members each having a projecting connecting portion, a hub member and a supporting member on said hub, having slots each receiving one of said projecting portions to limit the extent of movement of said catch members, a connecting member pivotally mounted on said hub member and being connected to said connecting portions of said catch members adjacent its opposite ends for allowing simultaneous movement of said catch members in opposite directions to an equal extent and a resilient member connected to said connecting plate adjacent one end and to said hub member adjacent its opposite end for spring loading said catches and maintaining substantially constant throw-out speed regardless of magneto position, said spring member having a portion encircling said hub member.

6. In an impulse coupling for use with a magneto, said impulse coupling including a pair of catch members, said catch members being mounted for sliding movement in opposite directions, a hub member, a connecting member pivotally mounted on said hub member and connected to said catch members adjacent its opposite ends for allowing simultaneous movement of said catch members in opposite direction to an equal extent for spring loading said catches and maintaining substantially constant throw-out speed regardless of magneto position, and a lock member for locking said connecting member on said hub.

7. In an impulse coupling for use with a magneto, said impulse coupling including a pair of catch members, a hub member, a connecting member pivotally mounted on said hub member and connected to said catch members adjacent its opposite ends for allowing simultaneous movement of said catch members in opposite directions to an equal extent and a resilient member connected to said connecting plate adjacent one end and to said hub member adjacent its opposite end for spring loading said catches and maintaining substantially constant throw-out speed regardless of magneto position, and a lock member for locking said connecting member on said hub.

WILLIAM D. CROCKER.
CHARLES STRNISTE.

REFERENCES CITED

The following references are of record in the file of this patent:

UNITED STATES PATENTS

| Number | Name | Date |
|---|---|---|
| 1,788,062 | Martin | Jan. 6, 1931 |
| 2,359,438 | Ochsenbein | Oct. 3, 1944 |

FOREIGN PATENTS

| Number | Country | Date |
|---|---|---|
| 523,898 | Great Britain | July 25, 1940 |